US011430146B2

(12) United States Patent
Yan et al.

(10) Patent No.: US 11,430,146 B2
(45) Date of Patent: Aug. 30, 2022

(54) TWO-STAGE DEPTH ESTIMATION MACHINE LEARNING ALGORITHM AND SPHERICAL WARPING LAYER FOR EQUI-RECTANGULAR PROJECTION STEREO MATCHING

(71) Applicant: Robert Bosch GmbH, Stuttgart (DE)

(72) Inventors: Zhixin Yan, Sunnyvale, CA (US); Liu Ren, Saratoga, CA (US); Yuyan Li, Columbia, MO (US); Ye Duan, Columbia, MO (US)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 17/086,352

(22) Filed: Oct. 31, 2020

(65) Prior Publication Data

US 2022/0138978 A1 May 5, 2022

(51) Int. Cl.
  *G06T 7/593* (2017.01)
  *G06T 3/00* (2006.01)
  *G06N 3/08* (2006.01)

(52) U.S. Cl.
  CPC .............. *G06T 7/593* (2017.01); *G06N 3/08* (2013.01); *G06T 3/0093* (2013.01); *G06T 2207/10028* (2013.01); *G06T 2207/20081* (2013.01); *G06T 2207/20084* (2013.01)

(58) Field of Classification Search
  CPC ................... G06T 7/593; G06T 3/0093; G06T 2207/10028; G06T 2207/20081; G06T 2207/20084; G06N 3/08

USPC .......................................................... 382/154
See application file for complete search history.

(56) References Cited

U.S. PATENT DOCUMENTS

| 10,346,998 | B1 * | 7/2019 | Anderberg | ................ G06T 5/00 |
| 10,534,960 | B2 * | 1/2020 | Perona | .................... G06V 20/56 |
| 2020/0118253 | A1 * | 4/2020 | Eisenmann | ............. G06T 15/10 |
| 2020/0302579 | A1 * | 9/2020 | Eisenmann | ........... G06T 11/003 |

OTHER PUBLICATIONS

Won, Changhee, Jongbin Ryu, and Jongwoo Lim. "Omnimvs: End-to-end learning for omnidirectional stereo matching." Proceedings of the IEEE/CVF International Conference on Computer Vision. 2019. (Year: 2019).*

(Continued)

*Primary Examiner* — Jonathan S Lee
(74) *Attorney, Agent, or Firm* — Brooks Kushman P.C.

(57) ABSTRACT

A system and method is disclosed having an end-to-end two-stage depth estimation deep learning framework that takes one spherical color image and estimate dense spherical depth maps. The contemplated framework may include a view synthesis (stage 1) and a multi-view stereo matching (stage 2). The combination of the two-stage process may provide the advantage of the geometric constraints from stereo matching to improve depth map quality, without the need of additional input data. It is also contemplated that a spherical warping layer may be used to integrate multiple spherical features volumes to one cost volume with uniformly sampled inverse depth for the multi-view spherical stereo matching stage. The two-stage spherical depth estimation system and method may be used in various applications including virtual reality, autonomous driving and robotics.

20 Claims, 7 Drawing Sheets

(56) References Cited

OTHER PUBLICATIONS

Won, Changhee, et al. "Omnislam: Omnidirectional localization and dense mapping for wide-baseline multi-camera systems." 2020 IEEE International Conference on Robotics and Automation (ICRA). IEEE, 2020. (Year: 2020).*

Won, Changhee, Hochang Seok, and Jongwoo Lim. "Upright and Stabilized Omnidirectional Depth Estimation for Wide-baseline Multi-camera Inertial Systems." Proceedings of the IEEE/CVF Conference on Computer Vision and Pattern Recognition Workshops . 2020. (Year: 2020).*

Zioulis, Nikolaos, et al. "Spherical view synthesis for self-supervised 360 depth estimation." 2019 International Conference on 3D Vision (3DV). IEEE, 2019. (Year: 2019).*

Sun, Cheng, et al. "Horizonnet: Learning room layout with 1d representation and pano stretch data augmentation." Proceedings of the IEEE/CVF Conference on Computer Vision and Pattern Recognition. 2019. (Year: 2019).*

Chang et al., Pyramid stereo matching network. In Proceedings of the IEEE Conference on Computer Vision and Pattern Recognition, pp. 5410-5418, 2018, <https://openaccess.thecvf.com/content_cvpr_2018/papers/Chang_Pyramid_Stereo_Matching_CVPR_2018_paper.pdf>.

Coors et al., Spherenet: Learning spherical representations for detection and classification in omnidirectional images, n Proceedings of the European Conference on Computer Vision (ECCV), pp. 518-533, 2018, <https://openaccess. thecvf.com/content_ECCV_2018/papers/Benjamin_Coors_SphereNet_Learning_Spherical_ECCV_2018_paper.pdf>.

Eder et al., Convolutions on spherical images, In Proceedings of the IEEE Conference on Computer Vision and Pattern Recognition Workshops, pp. 1-5, 2019, <https://openaccess.thecvf.com/content_CVPRW_2019/papers/SUMO/Eder_Convolutions_on_Spherical_Images_CVPRW_2019_paper.pdf>.

Eder et al., Mapped convolutions, 2019, 9 pages. arXiv:1906.11096v1 [cs.cv] Jun. 26, 2019, <https://arxiv.org/pdf/1906.11096>.

Gu et al., Cascade cost vol. for high-resolution multi-view stereo and stereo matching, 2019, arXiv:1912.06378v3 [cs.CV] Jun. 5, 2020, 15 pages, <https://arxiv.org/pdf/1912.06378>.

He et al., Deep residual learning for image recognition, In Proceedings of the IEEE conference on computer vision and patter recognition, pp. 770-778, 2016, <https://openaccess.thecvf.com/content_cvpr_2016/html/He_Deep_Residual_Learning_CVPR_2016_paper.html>.

Kendall et al., End-to-end learning of geometry and context for deep stereo regression, In Proceedings of the IEEE International Conference on Computer Vision, pp. 66-75, 2017, <https://openaccess.thecvf.com/content_ICCV_2017/papers/Kendall_End-To-End_Learning_of_ICCV_2017_paper.pdf>.

Tateno et al., Distortion-aware convolutional filters for dense prediction in panoramic images, In The European Conference on Computer Vision (ECCV), Sep. 2018, 16 pages, <https://openaccess.thecvf.com/content_ECCV_2018/papers/Keisuke_Tateno_Distortion-Aware_Convolutional_Filters_ECCV_2018_paper.pdf>.

Wang et al., 360sd-net: 360 stereo depth estimation with learnable cost vol. 2019, 7 pages, arXiv:1911.04460v2 [cs.CV] Mar. 26, 2020, <https://arxiv.org/pdf/1911.04460>.

Yao et al., Mvsnet: Depth inference for unstructured multi-view stereo, In Proceedings of the European Conference on Computer Vision (ECCV), pp. 767-783, 2018, <https://openaccess.thecvf.com/content_ECCV_2018/papers/Yao_Yao_MVSNet_Depth_Inference_ECCV_2018_paper.pdf>.

Zioulis et al., Omnidepth: Dense depth estimation for indoors spherical panoramas, In Proceedings of the European Conference on Computer Vision (ECCV), pp. 448-465, 2018, <https://openaccess.thecvf.com/content_ECCV_2018/papers/NIKOLAOS_ZIOULIS_OmniDepth_Dense_Depth_ECCV_2018_paper.pdf>.

\* cited by examiner

TWO-STAGE DEPTH ESTIMATION MACHINE LEARNING ALGORITHM AND SPHERICAL WARPING LAYER FOR EQUI-RECTANGULAR PROJECTION STEREO MATCHING

TECHNICAL FIELD

The present disclosure relates to a system and method having an end-to-end two-stage depth estimation machine learning framework and a spherical warping layer for equirectangular projection stereo matching.

BACKGROUND

Three-dimensional (3D) scene understanding may be relevant for applications like virtual reality (VR), augmented reality (AR), autonomous driving, or robotics. For example, quick and reliable acquisition of omnidirectional 3D data is considered a useful building block of such applications to enable user interaction with the digital environment.

SUMMARY

A system and method is disclosed for employing a two-stage depth estimation deep machine learning algorithm that comprises a first stage that provides a equirectangular projection (ERP) image to a coarse monocular depth estimation machine learning algorithm operable to estimate a coarse depth map. The first stage also comprising a differentiable depth image based rendering (DIBR) algorithm that receives the coarse depth map and generates one or more synthesized images.

A second stage may provide the ERP image and the one or more synthesized images to a multi-view stereo matching machine learning algorithm that includes two cascaded stages for disparity prediction in a coarse-to-fine manor. The multi-view stereo matching machine learning algorithm may also be operable to generate a final spherical depth map.

The second stage may include a spherical feature extraction machine learning algorithm that pairs the one or more synthesized images with the ERP image and generates one or more feature maps. The second stage may also include a cost volume construction algorithm that aggregates spherical features extracted from the ERP image and the one or more synthesized images. The cost volume construction algorithm may also generate a cost volume using a depth hypothesis that is uniformly sampled. It is contemplated the one or more feature maps may be used by the cost volume construction algorithm to generate the cost volume. It is also contemplated the depth hypothesis may be uniformly sampled at a specified level using new intervals.

The second stage may further include a cost aggregation machine learning algorithm operable to aggregate the cost volume using one or more 3-dimensional convolutional neural networks. The cost aggregation machine learning algorithm may be implemented using an hourglass encoding and decoding processes. The second stage may include a regression algorithm that regresses a disparity value pixel-wise for each specified level. It is contemplated that the coarse depth map and the final spherical depth map may be supervised using a ground truth depth map.

It is also contemplated that the coarse monocular depth estimation machine learning algorithm may be implemented as a light-weight machine learning network that utilizes coordinate convolution to enforce 360-degree awareness. The DIBR algorithm may also be operable to transform a first pixel set from the ERP image to a second pixel set on a target image in a fully differentiable manner. Lastly, the DIBR algorithm may be operable to splat the first pixel set on the target image, the DIBR algorithm also including a soft z-buffering algorithm to handle occlusions, and the DIBR algorithm may generate a final prediction that is a weighted average of points which splat to a single pixel from the second pixel set.

DETAILED DESCRIPTION

Figure 1:
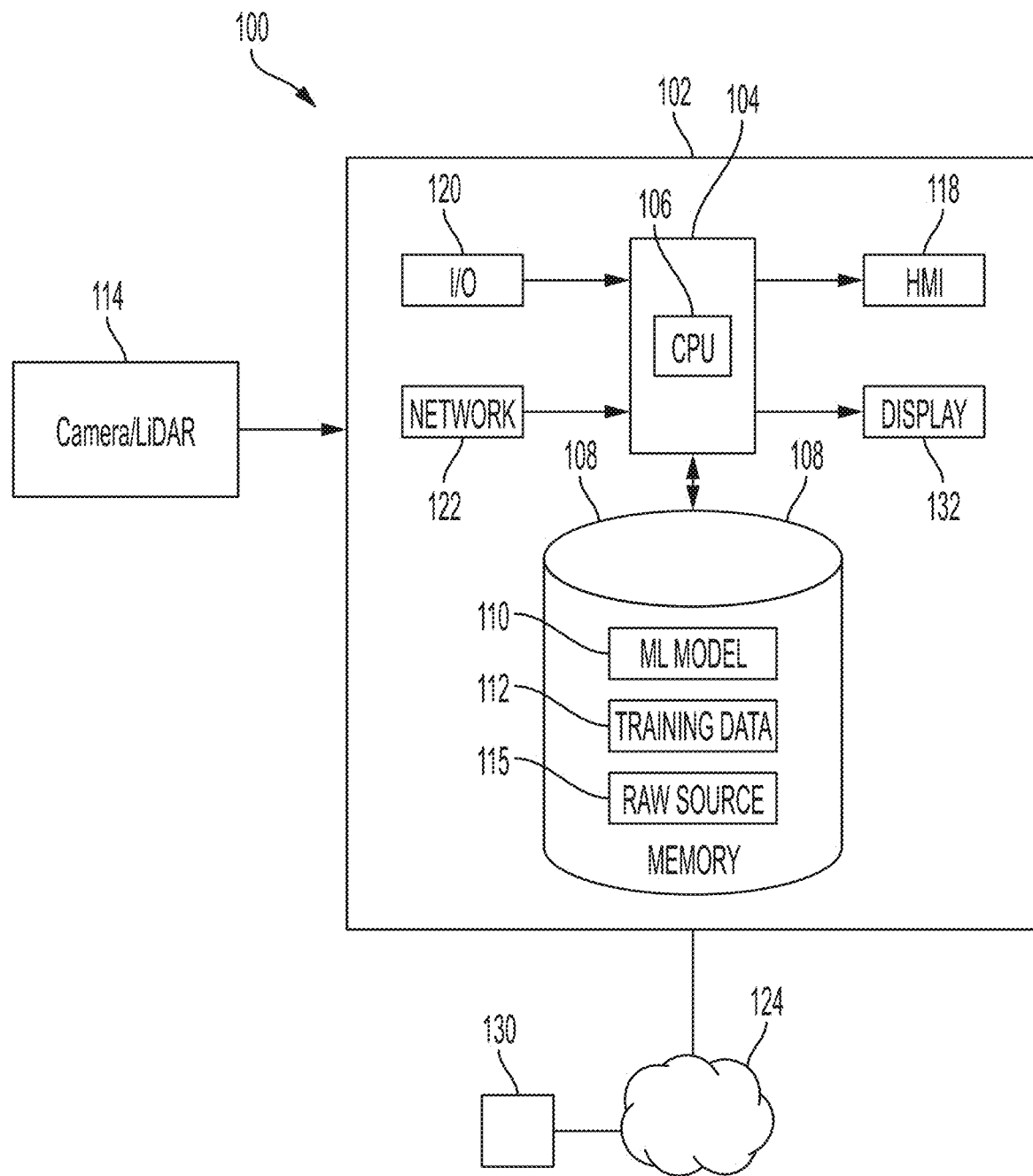
FIG. 1 depicts an exemplary computing system that may be used by disclosed embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Machine learning algorithms (e.g., CNN or DNN) employed on spherical images are increasingly becoming more widely used. For instance, machine learning algorithms are emerging in applications pertaining to deep learning on 360-degree images. Also, equi-rectangular projection images (which may be a continuous context representation that includes mild to severe distortion) is one known representation of omnidirectional images.

To improve the effectiveness of a convolutional kernel employed by a machine learning algorithm omni-depth may be used to introduce a series of rectangular filter banks of various kernel sizes to account for equirectangular distortions. It is also contemplated that distortion-aware spherical kernels derived from traditional convolutional kernels may also be employed. Such kernels may be designed for operation with CNNs as special layers, which is usually used in the feature extraction stage of stereo matching network.

However, it is contemplated another approach may include a spherical warping layer applied in a cost volume construction.

It is understood that machine learning algorithms may also be employed to address depth estimation by modeling the mapping between monocular images and depth maps. Multi-task machine learning algorithm may also be employed to jointly predict semantic labels, normals, and depth simultaneously. For instance, a known "pano-popup" algorithm may be employed to predict dense depth, surface normal, plane boundaries simultaneously from a single equirectangular image.

Unsupervised deep learning approaches for monocular depth estimation may also use self-constraints without direct depth supervision. A known framework based on view synthesis and a loss computed when warping from nearby views to target may be used, but such an approach may output reconstruction loss in image construction that may look good visually but has a low-quality depth. To overcome known problems, a geometric constraint may be employed. For instance, a left-right consistency and epipolar constraint may be employed. Also, for spherical images, cube maps from 360-degree video may be employed with photometric and pose consistency as a supervision signal. Unsupervised methods are also understood as reducing the need for ground truth data, but these existing techniques may not produce high quality depth maps that are satisfactory.

Also, omnidepth and mapped convolution may utilize special kernels designed for spherical images to improve geometry learning accuracy. However, directly learning depth using a machine learning algorithm may require a large amount of training data to learn the implicit mapping from 2D image space t depth. Even though 360-degree cameras can be accessed at a reasonable cost, building a comprehensive 360-degree dataset with ground truth depth and label is not always feasible or cost effective.

While previous stereo matching approaches may perform well on perspective stereo images, they may not always be applicable directly on 360-degree stereo images, due to the nature of spherical geometry. For instance, a known algorithm called "360SD-Net" utilizes CNN based techniques on 360-degree stereo images. A downside to this known algorithm is that it employs a learnable shifting layer for cost volume hypothesis plane sampling that tends to require extra training resources. It is contemplated the spherical warping layer disclosed by the present application may be a closed-form machine learning solution that does not require trainable parameters. The disclosed spherical warping layer may also be differentiable such that it can be used in end-to-end stereo matching network.

Furthermore, prior known systems may employ a learnable shifting layer for cost volume hypothesis plane sampling. In contrast, the disclosed two-stage system and method may provide a self-refining mechanism to achieve better and more accurate disparity result for 360-degree stereo images. Moreover, RGB-D spherical data as well as spherical stereo pairs may be expensive resources to acquire, but the disclosed two-stage machine learning algorithm may overcome such expense due to the fact it can be trained using a smaller dataset.

Three-dimensional (3D) scene understanding may also be relevant for applications like virtual reality (VR), augmented reality (AR), autonomous driving, or robotics. For example, quick and reliable acquisition of omnidirectional 3D data is considered a useful building block of such applications to enable user interaction with the digital environment.

It is therefore contemplated that to obtain high-quality omnidirectional 3D information, devices such as omnidirectional LiDARs may be used for applications like autonomous driving vehicles or indoor 3D scans. However, LiDARs may be expensive or may produce sparse 3D scans. Compared with LiDARs, more traditional cameras may be cheaper in cost and are more commonly used for capturing the visual appearance of scenes. It is therefore contemplated that a significant cost savings can be realized by generating high-quality omnidirectional 3D scans using conventional camera images.

In order to realize the technological benefit and cost saving of using conventional camera images an end-to-end two-stage depth estimation deep learning framework (i.e., PanoDepth framework) may be used that consists of two stages. The first stage may be a view synthesis along with a stereo matching second stage for monocular omnidirectional depth estimation. The PanoDepth framework is contemplated as taking one equirectangular projection (ERP) image as input to produce synthesized views in the first stage. The first stage may then pass the original image and one or more synthesized views to the subsequent stereo matching stage to generate finer depth map. In the stereo matching second stage, an omnidirectional multi-view stereo matching network may be used to handle omnidirectional stereo pairs.

FIG. 1 depicts an exemplary system 100 that may be used to implement the PanoDepth framework. The system 100 may include at least one computing devices 102. The computing system 102 may include at least one processor 104 that is operatively connected to a memory unit 108. The processor 104 may be one or more integrated circuits that implement the functionality of a central processing unit (CPU) 106. It should be understood that CPU 106 may also be one or more integrated circuits that implement the functionality of a general processing unit or a specialized processing unit (e.g., graphical processing unit, ASIC, FPGA).

The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all the described features, it is intended that various features and functions may be separated and implemented by multiple computing units in communication with one another. The system architecture selected may depend on a variety of factors.

The system 100 may implement a machine-learning algorithm 110 that is configured to analyze the raw source data 115. The raw source data 115 may include raw or unprocessed sensor data that may be representative of an input dataset for a machine-learning system. The raw source data 115 may include video, video segments, images, and raw or partially processed sensor data (e.g., image data received from camera 114 that may comprise a digital camera or LiDAR). In some examples, the machine-learning algorithm 110 may be a neural network algorithm that is designed to perform a predetermined function. For example, the neural network algorithm may be configured in automotive applications to identify objects (e.g., pedestrians) from images provided from a digital camera and/or depth map from a LiDAR sensor.

The system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In one example, the training dataset 112 may include source images and depth maps from various scenarios in which objects (e.g., pedestrians) may be identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may also be configured to identify a feature in the raw source data 115. The raw source data 115 may include a plurality of instances or input dataset for which annotation results are desired. For example, the machine-learning algorithm 110 may be configured to identify the presence of a pedestrian in images and annotate the occurrences. The machine-learning algorithm 110 may be programmed to process the raw source data 115 to identify the presence of the features. The machine-learning algorithm 110 may be configured to identify a feature in the raw source data 115 as a predetermined feature. The raw source data 115 may be derived from a variety of sources. For example, the raw source data 115 may be actual input data collected by a machine-learning system. The raw source data 115 may be machine generated for testing the system. As an example, the raw source data 115 may include raw digital images from a camera.

In the example, the machine-learning algorithm 110 may process raw source data 115 and generate an output. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
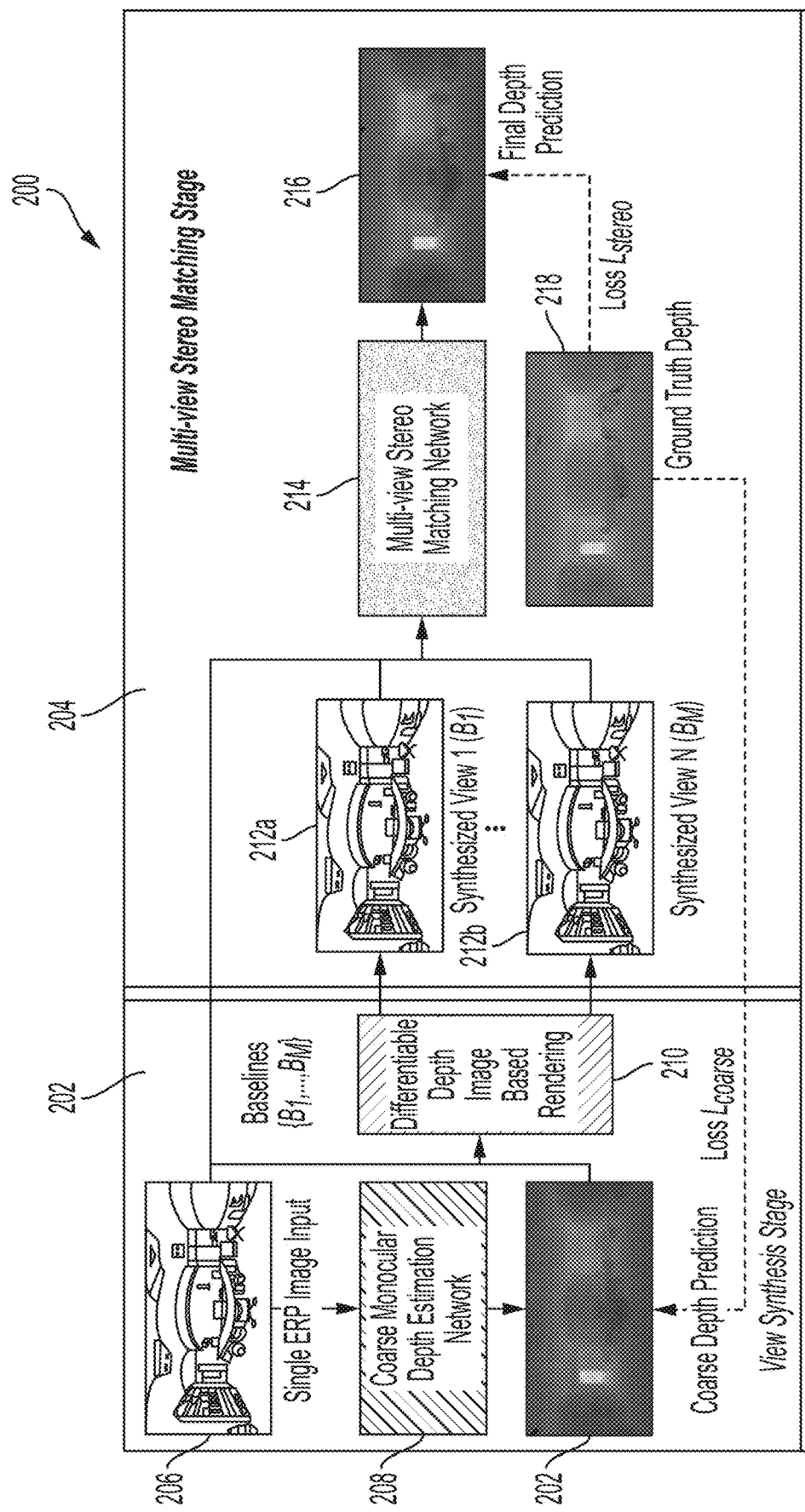
FIG. 2 illustrates an exemplary embodiment of a end-to-end two-stage depth estimation deep learning framework.

FIG. 2 illustrates a block diagram 200 illustrating an embodiment of a two-stage framework architecture (i.e., PanoDepth) that may receive a single ERP image as input and produces one or more high-quality omnidirectional depth maps. As illustrated, block diagram 200 may include a coarse depth estimation network 202 (i.e., first stage) and a multi-view stereo matching network 204 (i.e., second stage).

At block 206, network 202 may receive a single ERP image from camera 114. For example, the ERP image may be a single 360-degree image of a given scene. The ERP image may then be provided to a coarse depth estimation network 208 that is operable to estimate an initial depth map that is provided to a differentiable depth image based rendering (DIBR) module 210. Module 210 may then use the provided depth map to synthesize novel views with predefined baselines.

It is contemplated that at module 208 may employ a light-weight network to generate synthesized quality novel views, moderate quality depth maps, or even coarse multi-plane depth maps. For instance, module 208 may employ a known light-weight network called "CoordNet" for the coarse depth estimation. The CoordNet network may be employed to utilize coordinate convolutions to enforce 360-awareness of the ERP image. However, other known networks may be employed for the coarse depth estimation. The estimated coarse depth map and the ERP image may then be provided to DIBR module 210 which renders multiple synthesized views of pre-defined baselines. It is contemplated that vertical baselines may be selected and used over horizontal baselines.

By employing CoordNet, a single view 360-degree image may be passed through the module 208 to generate a coarse depth estimation. The generated coarse depth map may support rendering the input 360-degree image using the DIBR module 210 which transforms pixels from source image to pixels on target image in a fully differentiable manner. It is contemplated that the transformation operation employed by DIBR module may be employed using a layer-structured three-dimensional scene inference. The pixels from the source image may then be splatted on an empty target image. Occlusions may then be handled by soft z-buffering and the final prediction may be the weighted average of points which splat to the same pixel.

The multi-view stereo matching network 204 (i.e., second stage) may then be employed to generate accurate and robust omnidirectional depth estimations. First, one or more synthesized images 212a-212b provided by the DIPR module 210 along with the input ERP image 206 may be passed to a stereo matching network 214 to generate a final depth map 216. It is contemplated the stereo matching network may include two cascaded stages for disparity prediction in a coarse-to-fine manor.

Supervision from a ground truth depth 218 may also be imposed on the depth produced from the coarse monocular depth estimation network 208 and the disparity generated from stereo matching network 214. For instance, a ground truth depth image 218 may also be used to supervise and train the coarse depth prediction 220 generated by the coarse depth estimation network 208 and the final depth prediction 216 generated by the stereo matching network 204 in an end-to-end fashion.

In short, block diagram 200 illustrates a two stage network that includes: (1) a coarse depth estimation network 208 followed by a differentiable DIBR module 210 for novel view synthesis, and (2) a multi-view stereo matching network 204 with a differentiable Spherical Warping Layer and a cascade mechanism for efficient and high-quality depth estimation. The ERP image 206 may be initially passed into the coarse depth estimation network 208 to estimate a initial depth map for DIBR module 210 to synthesize novel views with pre-defined baselines. Then the original ERP image 206 and synthesized images 212a-212b may be fed into the multi-view stereo matching network 204 to generate the final depth map 216. These two networks may be trained in an end-to-end fashion, and both are supervised using ground truth depth 218.

Figure 3:
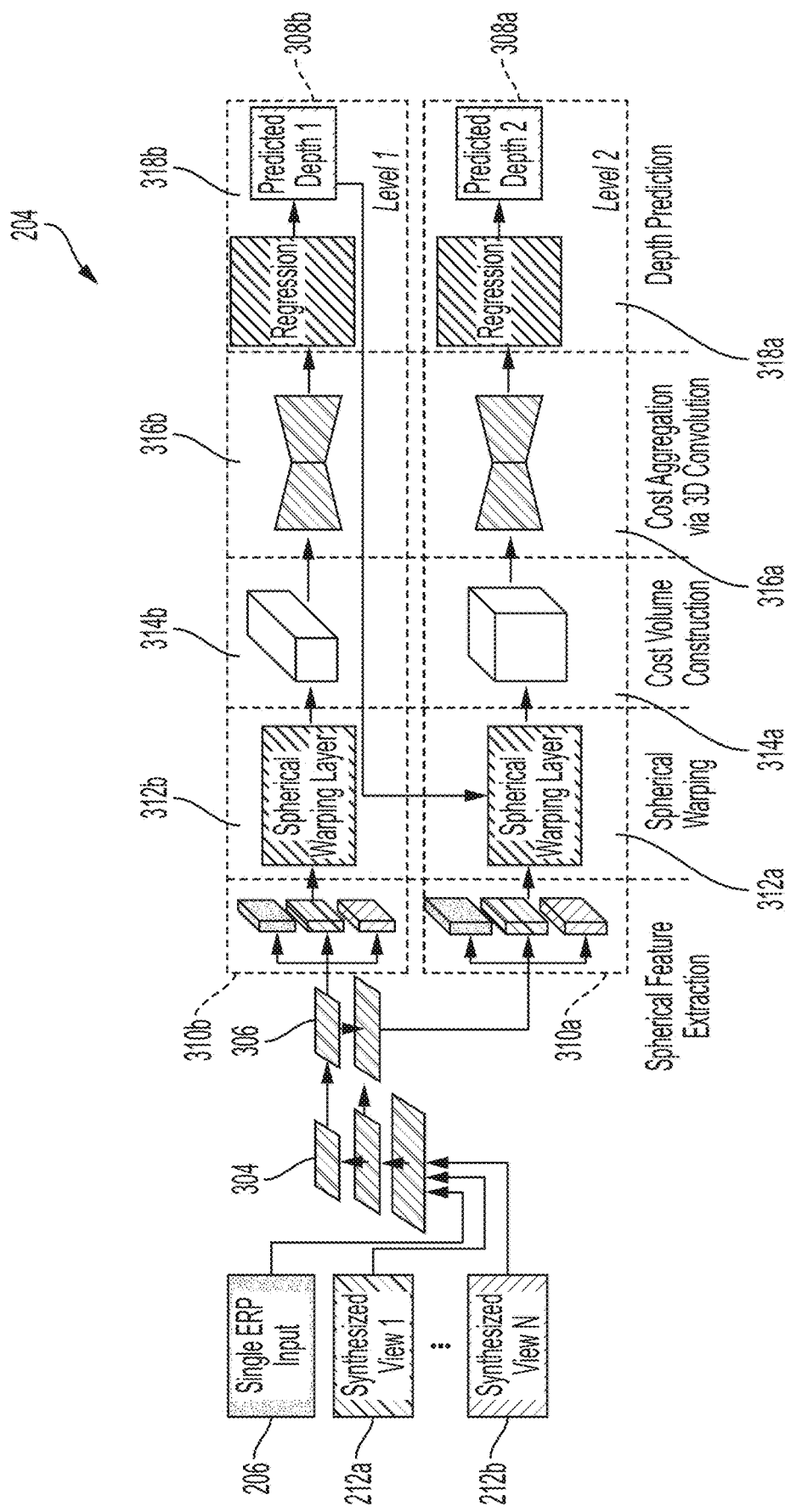
FIG. 3 illustrates an exemplary embodiment of a multi-view omnidirectional stereo matching network.

FIG. 3 illustrates an embodiment of the multi-view stereo matching network 204 (i.e., second stage). As illustrated network 204 may include one or more input levels 308a-308b. However, it is contemplated that only one input level (e.g., 308a) may be used. Each of the input levels 308a-308b may further include a spherical feature extraction network 310a-310b, a spherical warping layer (SWL) 312a-312b, a cost volume construction module 314a-314b, a cost aggregation module 316a-316b, and a depth prediction module 318a-318b.

As illustrated, one or more generated synthesized views (i.e., 212a-212b) may be paired with the input ERP image 206 and passed through a weight-sharing feature extraction network 304. It is contemplated network 304 may be constructed using one or more known convolutional neural networks with multiple layers stacked together.

Figure 4:
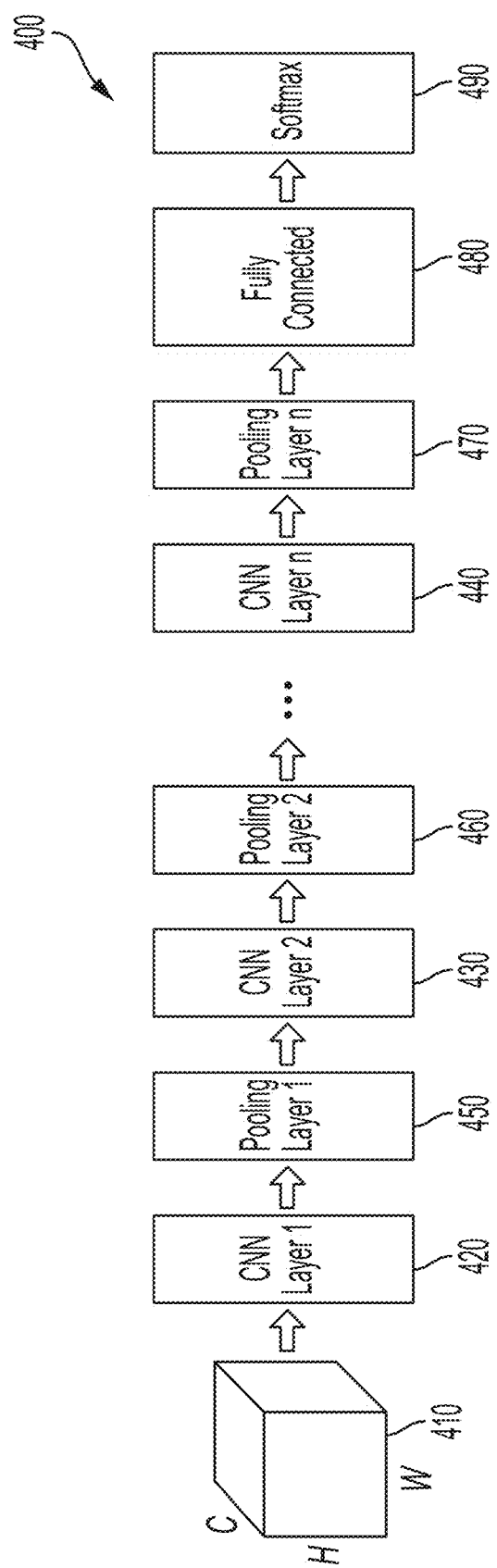
FIG. 4 illustrates an exemplary machine learning convolutional neural network (CNN).

For instance, FIG. 4 illustrates an exemplary CNN 400 that may be implemented as part of network 204 (or as part of other networks employed within network 202 or network 204). As illustrated, CNN 400 may include one or more convolutional layers 440-440; one or more pooling layers 450-470; one or more fully connected layer 460; and a softmax layer 470. It is contemplated the CNN 400 may alternatively be implemented using a known DNN or decision tree depending upon a given application.

CNN 400 may receive data 410 (e.g., input 204 and/or synthesized views 212a-212b). It is contemplated the data 410 may be lightly processed prior to being provided to CNN 400. Convolutional layers 440-440 may be designed to extract features from data 410. For instance, convolutional layer 440-440 may employ filtering operations (e.g., kernels) before passing on the result to the next layer of the CNN 400. The filtering operations may include image identification, edge detection of an image, and image sharpening that are applied when the data 410 received is an image.

The CNN 400 may also include one or more pooling layers 450-470 that receives the convoluted data from the respective convolution layer 440-440. Pooling layers 450-470 may include one or more pooling layer units that apply a pooling function to one or more convolution layer outputs computed at different bands using a pooling function. For instance, pooling layer 450 may apply a pooling function to the kernel output received from convolutional layer 440. The pooling function implemented by pooling layers 450-470 may be an average or a maximum function or any other function that aggregates multiple values into a single value.

Next, one or more fully connected layers 480 may attempt to learn non-linear combinations for the high-level features in the output data received from the convolutional layers 440-440 and pooling layers 450-470. Lastly, CNN 400 may include a softmax layer 490 that combines the outputs of the fully connected layer 480 using softmax functions. The CNN 400 may employ a batch normal layer, a max pooling layer, and a dropout layer. It is contemplated CNN 400 may employ spatial pyramid-pooling layer to extract multi-scale context information. It is also contemplated CNN 400 may include one or more pooling layers having varying sizes.

With reference back to FIG. 3, the multi-scale context information may then be input to the spherical feature network 310a-310b. It is contemplated that for each input in the stereo pair with a resolution of 3×Z×W, the feature extraction network 310a-310b may output a feature map having a resolution of $$32 \times \frac{H}{4} \times \frac{W}{4}.$$

It is also contemplated that for network 310a-310b, each cascade level ($l^{th}$) where l>1 the output feature map may have a resolution of $$32 \times \frac{H}{2^{n-1}} \times \frac{W}{2^{n-1}}.$$

However, it is contemplated that the feature map may have a resolution greater or less than 32.

Again, over the last several years there has been a significant growth in the VR and AR market. As a result of this growth, a larger number of 360-degree cameras are being developed and used as a source of content generation for VR and AR applications. By pairing two adjacent 360-degree images, it is contemplated that stereo matching techniques may be leveraged to generate 3D information. However, since equirectangular projection (ERP) introduces distortions in the image (e.g., image 206) previous stereo matching approaches (e.g., conventional and deep learning machine algorithms) may not be applicable to ERP stereo pairs.

It is also contemplated that for perspective stereo images, disparity may also be proportional to the inverse depth. The discrete disparity hypothesis planes could be sampled uniformly and later merged together based on estimated probabilities. For spherical stereo, however, disparity may be related to both inverse depth and latitude values across the image. With the irregular distortion introduced by spherical geometry, uniform hypothesis plane sampling is not ideal for equirectangular stereo pairs. As discussed above, known algorithms try to employ a trainable shifting filter to select the optimal hypothesis step, but these approaches require large computational processing overhead and converge at an unacceptably slow rate.

Network 204 may therefore include one or more spherical warping layers (SWL) 312a-312b that operably transform the uniformly sampled disparity or inverse depth to spherical coordinates during a spherical cost volume construction. It is contemplated the SWL 312a-312b may be differentiable and may be used (e.g., as a plug in) within network 204 for end-to-end deep stereo matching networks. SWL 312a-312b may provide stereo matching approaches for perspective projection images that are applicable to ERP stereo pairs. It is contemplated that SWL 312a-312b may deterministically transform uniformly sampled inverse depth or disparities to spherical displacement to reduce processing needs or memory usage. The SWL 312a-312b may therefore be used instead of a learnable layer for constructing a cost volume.

For instance, SWL 312a-312b may be employed as part of an inverse depth that is sampled uniformly to cover the whole depth range, as represented by Equation 1 below:

$$\frac{1}{d_j} = \frac{1}{d_{max}} + \left(\frac{1}{d_{min}} - \frac{1}{d_{max}}\right)\frac{v \times j}{D-1}, j \in D-1 \qquad \text{Equation (1)}$$

Where D is the total number of hypothesis planes, $d_j$ is the $j^{th}$ depth plane, $d_{min}$ and $d_{max}$ are the minimum and maximum value of depth, and v is the plane interval. It is contemplated that SWL 312a-312b may transform depth hypothesis $d_j$ to displacement in spherical domain $C_j$ to map pixels from the synthesized view to the original view. The displacement $C_j$ may then be defined using equation 2 below:

$$C_{x,y} = 0, \quad C_{y,j} = \frac{\cos(\theta) \times b}{d_j} \frac{H_f}{\pi} \qquad \text{Equation (2)}$$

Where $\theta$ refers to latitudinal values across the image, b represents the baseline, and $H_f$ is the height of the feature map. As opposed to known learnable shifting filters, SWL 312a-312b is designed to be a closed-form solution that does not require overhead training.

It is contemplated that with the displacements Cj from SWL 312a-312b, the spherical features extracted from M views may be aggregated to build the cost volume with uniformly sampled depth hypothesis. Known fusion implementations that include a variance-based cost volume formation method or cascade design may also be applied to improve accuracy. It is contemplated that SWL 312a-312b may be designed to work seamlessly with such known cascaded designs. Also, at each level l, the depth hypothesis may be uniformly sampled using new intervals calculated based on predictions in level l+1. The corresponding displacements may then be calculated using the same spherical coordinate mapping procedure.

Network 204 may further include a cost volume construction module 314a-314b which may use the extracted feature maps to build a cost volume. The feature maps may be provided from the spherical feature extraction module 310a-310b or from the spherical warping layer 312a-312b when implemented.

After the construction of cost volume employed by module 316a-316b, a cost aggregation module 316a-316b may be employed to aggregate different levels of spatial context information using an hourglass shaped encoding and decoding process. Module 316ba-316b may be designed using one or more multi-scale 3-Dimensional CNN machine learning algorithms. It is also contemplated that module 316a-316b may help to regularize noises in ambiguous regions caused by occlusions or texture-less surfaces to help improve final prediction quality. Module 316a-316b may then regress disparity value pixel-wise for each stage l as shown by Equation 3 below:

$$\frac{1}{\tilde{d}} = \frac{1}{d_{min}} + \left(\frac{1}{d_{max}} - \frac{1}{d_{min}}\right)\frac{k}{D-1} \qquad \text{Equation (3)}$$

where k is the summation of each plane level l weighted by its normalized probability as shown by Equation 4 below:

$$k = \sum_{j=0}^{D-1} \sigma(p_j) \times v_{j,l} \times j \qquad \text{Equation (4)}$$

where $\sigma(\cdot)$ represents softmax functions and $p_j$ denotes the probability of $j^{th}$ plane value. $v_{j,i}$ is the interval at the level l.

It is contemplated that network 200 may be trained in an end-to-end fashion where supervision may be applied on both sub-processes (i.e. stage 202 and stage 204). The final loss function for the complete network may be defined as Loss=$\lambda_1 L_{coarse} + \lambda_2 L_{stereo}$ where $\lambda_1$ and $\lambda_2$ are the weights of coarse depth estimation loss and stereo matching loss respectively. It is also contemplated the combination of smooth $L_1$ loss and a smoothness term for depth estimation on non-empty pixels denoted as p, depth is denoted as D in Equation 5 below:

$$L_{coarse} = \frac{\alpha}{|M|} \sum_p M(p)|D_{gt}(p) - D_{pred}(p)| \frac{\beta}{|M|} \sum_p M(p) \|\nabla D_{pred}(p)\|^2 \qquad \text{Equation (5)}$$

Where M(p) is a binary mask that is used to mask out missing regions, $\alpha$ and $\beta$ are the weights for $L_1$ loss and smoothness term. It is also contemplated that network 200 may calculate berHu loss on all outputs from each level and then compute the weighted summation. The same binary mask M may be applied to the complete network 200 and the stereo matching loss may be defined using Equation 6 below:

$$L_{stereo} = \frac{1}{|M|}\sum_{i \in M}\sum_{l}^{N} \lambda_l L_{berHu}(D_{gt}, \bar{D_i})  \quad \text{Equation (6)}$$

Where $\lambda_l$ is the loss weight for $l^{th}$ level.

Figure 5:
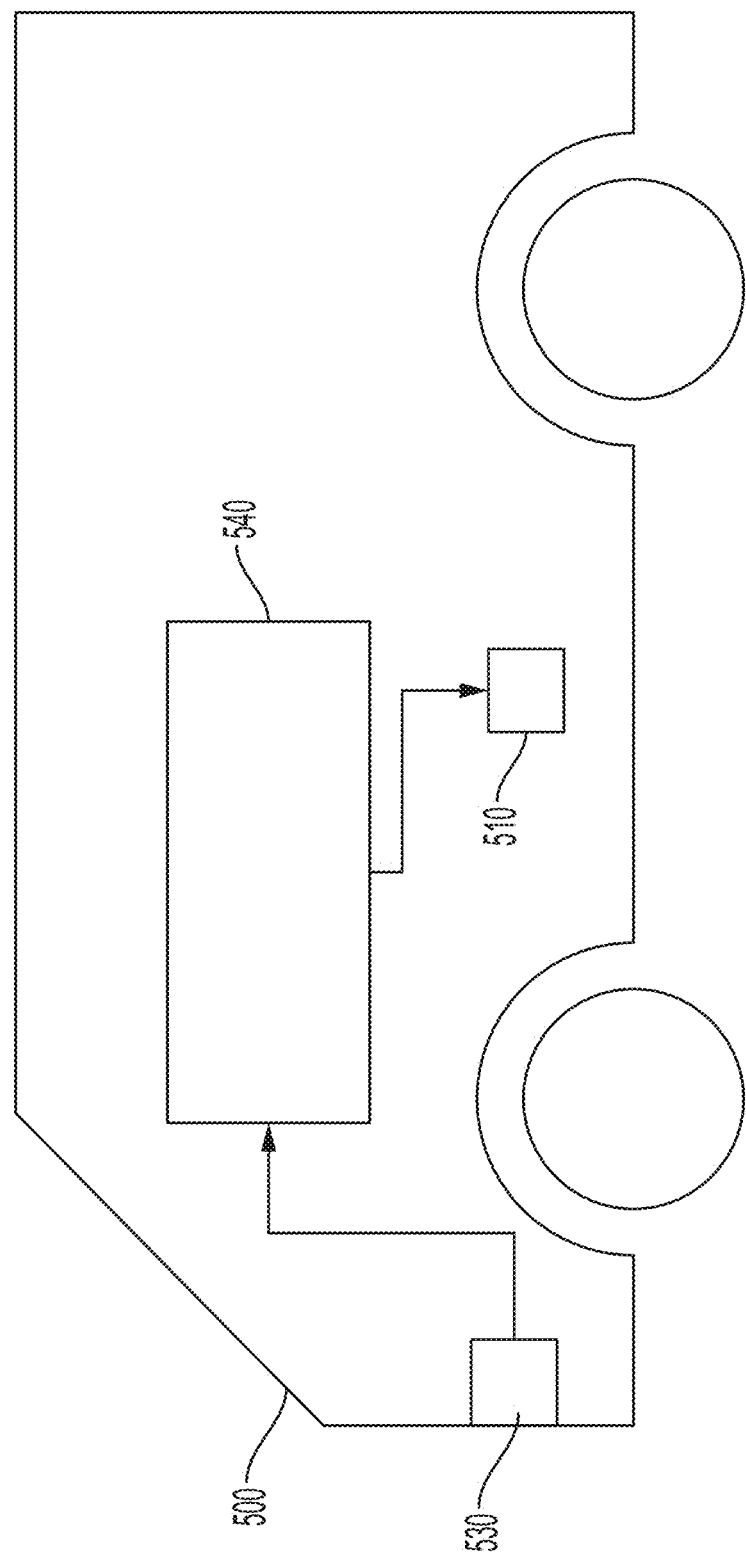
FIG. 5 is an embodiment in which a computer system may be used to control an automated personal assistant.
Figure 6:
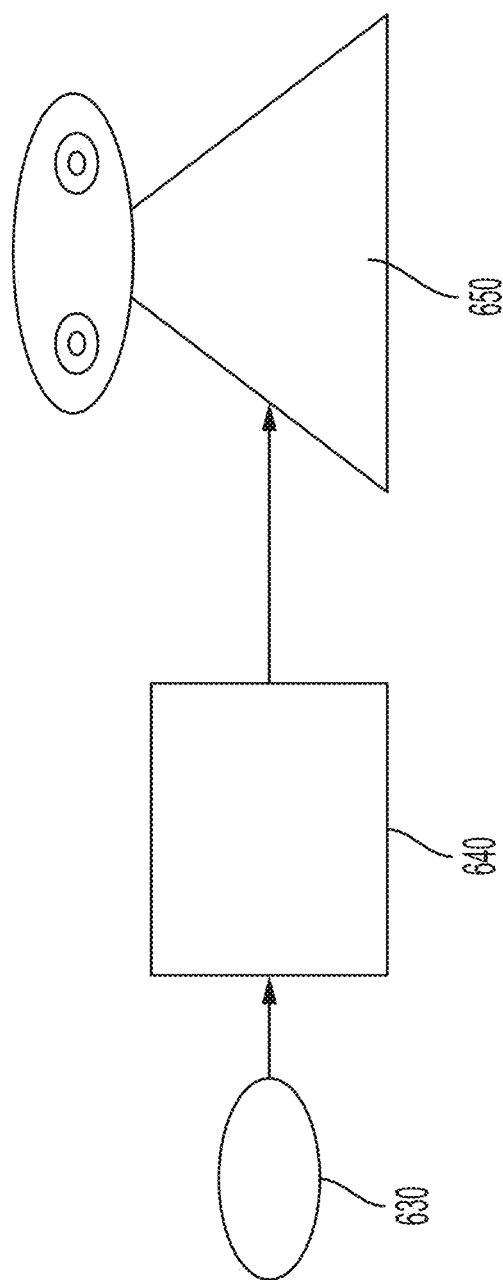
FIG. 6 illustrates a computing system controlling an at least partially autonomous robot.
Figure 7:
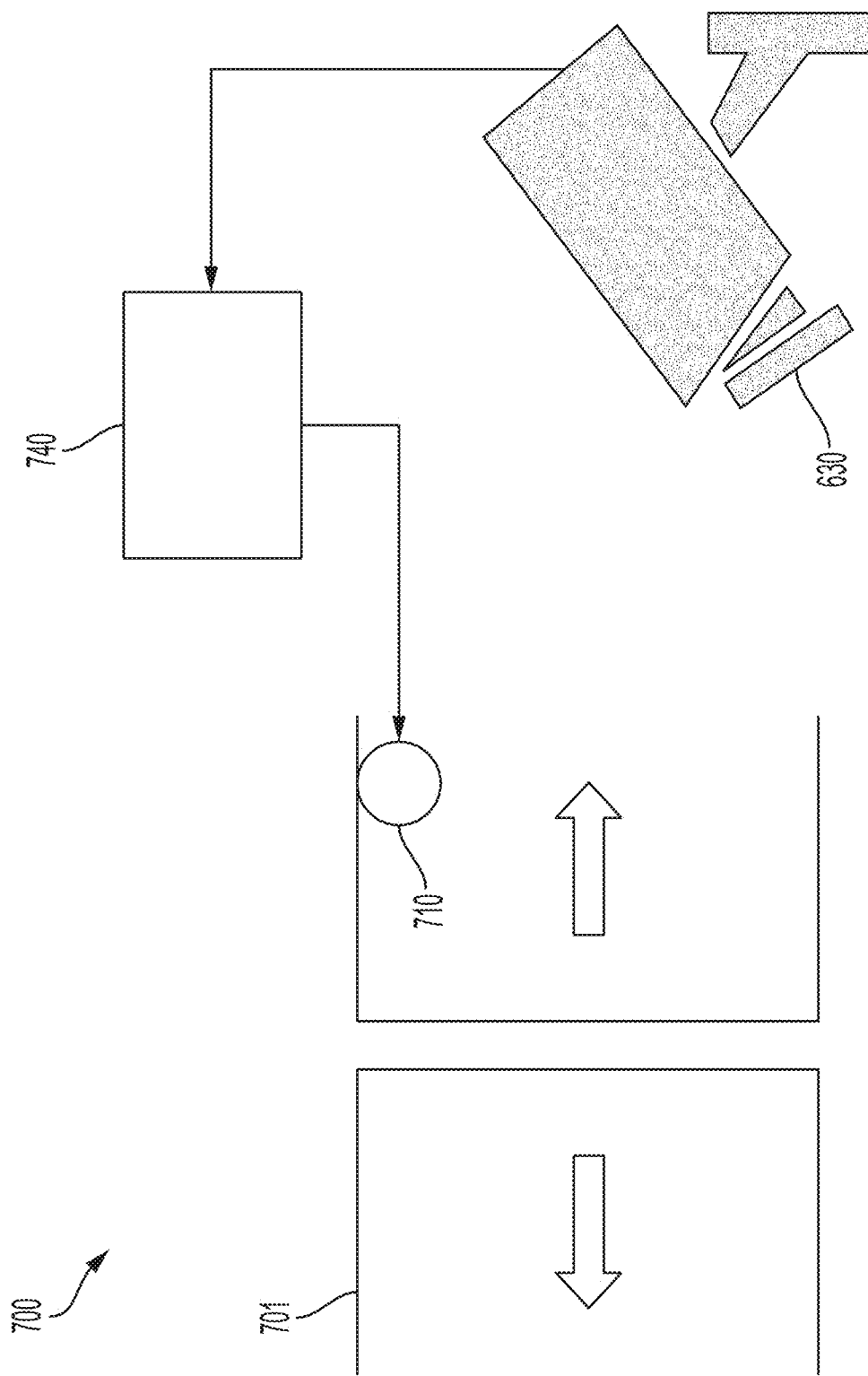
FIG. 7 is an embodiment in which the computing system may be used to control a surveillance system.

FIGS. 5-7 illustrate various applications that may be used for implementation of the two-stage network (i.e., network 202 and 204). For instance, FIG. 5 illustrates an embodiment in which a computing system 540 may be used to control an at least partially autonomous robot, e.g. an at least partially autonomous vehicle 500. The computing system 540 may be like the system 100 described in FIG. 1. Sensor 530 may comprise one or more video/camera sensors and/or one or more radar sensors and/or one or more ultrasonic sensors and/or one or more LiDAR sensors and/or one or more position sensors (like e.g. GPS). Some or all these sensors are preferable but not necessarily integrated in vehicle 500.

Alternatively, sensor 530 may comprise an information system for determining a state of the actuator system. The sensor 530 may collect sensor data or other information to be used by the computing system 540. One example for such an information system is a weather information system which determines a present or future state of the weather in environment. For example, using input signal x, the classifier may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 510, which may be integrated in vehicle 500, may be given by a brake, a propulsion system, an engine, a drivetrain, or a steering of vehicle 500. Actuator control commands may be determined such that actuator (or actuators) 510 is/are controlled such that vehicle 400 avoids collisions with said detected objects. Detected objects may also be classified according to what the classifier deems them most likely to be, e.g. pedestrians or trees, and actuator control commands A are determined depending on the classification.

Shown in FIG. 6 is an embodiment in which computer system 640 is used for controlling an automated personal assistant 650. Sensor 630 may be an optic sensor, e.g. for receiving video images of a gestures of user 649. Alternatively, sensor 630 may also be an audio sensor e.g. for receiving a voice command of user 649.

Control system 640 then determines actuator control commands A for controlling the automated personal assistant 650. The actuator control commands A are determined in accordance with sensor signal S of sensor 630. Sensor signal S is transmitted to the control system 640. For example, classifier may be configured to e.g. carry out a gesture recognition algorithm to identify a gesture made by user 649. Control system 640 may then determine an actuator control command A for transmission to the automated personal assistant 650. It then transmits said actuator control command A to the automated personal assistant 650.

For example, actuator control command A may be determined in accordance with the identified user gesture recognized by classifier. It may then comprise information that causes the automated personal assistant 650 to retrieve information from a database and output this retrieved information in a form suitable for reception by user 649.

In further embodiments, it may be envisioned that instead of the automated personal assistant 650, control system 640 controls a domestic appliance (not shown) controlled in accordance with the identified user gesture. The domestic appliance may be a washing machine, a stove, an oven, a microwave or a dishwasher.

Shown in FIG. 6 is an embodiment in which computing system controls an access control system 600. Access control system may be designed to physically control access. It may, for example, comprise a door 601. Sensor 630 is configured to detect a scene that is relevant for deciding whether access is to be granted or not. The sensor 630 may collect image data or video data related to the scene. It may for example be an optical sensor for providing image or video data, for detecting a person's face. Classifier may be configured to interpret this image or video data e.g. by matching identities with known people stored in a database, thereby determining an identity of the person. Actuator control signal A may then be determined depending on the interpretation of classifier, e.g. in accordance with the determined identity. Actuator 610 may be a lock which grants access or not depending on actuator control signal A. A non-physical, logical access control is also possible.

Shown in FIG. 7 is an embodiment in which computing system 740 controls a surveillance system 700. This embodiment is largely identical to the embodiment shown in FIG. 5. Therefore, only the differing aspects will be described in detail. Sensor 730 is configured to detect a scene that is under surveillance. The sensor 730 may collect image data or video data related to the scene. The computing system does not necessarily control an actuator 710, but a display 710a. For example, the machine learning system may determine a classification of a scene, e.g. whether the scene detected by optical sensor 730 is suspicious. Actuator control signal A which is transmitted to the display 710a may then e.g. be configured to cause the display 710a to adjust the displayed content dependent on the determined classification, e.g. to highlight an object that is deemed suspicious by machine learning system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for employing a spherical warping layer machine learning algorithm within a spherical stereo matching network, comprising:
   receiving one or more equirectangular projection (ERP) images from a sensor;
   receiving a feature map from a spherical feature extraction machine learning algorithm; and
   transforming an inverse depth hypothesis to a displacement in a spherical-coordinate domain, wherein the displacement is generated using a cosine angle of one or more latitudinal values across the one or more ERP images, one or more baseline values, and a height of the feature map.

2. The method of claim 1, wherein the inverse depth hypothesis covers a whole depth range.

3. The method of claim 1, further comprising: mapping one or more pixels from one or more synthesized images to the ERP image.

4. The method of claim 3, wherein the spherical stereo matching network includes two cascaded stages for disparity prediction in a coarse-to-fine manner, wherein a multi-view stereo matching machine learning algorithm is operable to generate a final spherical depth map.

5. The method of claim 4, wherein the spherical stereo matching network further includes a spherical feature extraction algorithm operable to pair the one or more synthesized images with the ERP image.

6. The method of claim 5, wherein the spherical stereo matching network generates one or more feature maps.

7. The method of claim 6, wherein the one or more feature maps have a resolution of 32 multiplied by one fourth of a width of the ERP image and one fourth of a second height of the ERP image.

8. The method of claim 6, wherein the spherical stereo matching network further includes a cost volume construction algorithm that aggregates spherical features extracted from the ERP image and the one or more synthesized images.

9. The method of claim 8, wherein the cost volume construction algorithm generates a cost volume using a depth hypothesis that is uniformly sampled.

10. The method of claim 9, wherein the one or more feature maps are used by the cost volume construction algorithm to generate the cost volume.

11. The method of claim 10, wherein the spherical stereo matching network further includes a cost aggregation machine learning algorithm operable to aggregate the cost volume using one or more 3-dimensional convolutional neural networks.

12. The method of claim 11, wherein the cost aggregation machine learning algorithm is implemented using an hourglass encoding and decoding processes.

13. The method of claim 11, wherein the spherical stereo matching network further includes a regression algorithm that regresses a disparity value pixel-wise for each specified level.

14. The method of claim 9, wherein the depth hypothesis is uniformly sampled at a specified level using new intervals.

15. A system for employing a spherical warping layer machine learning algorithm within a spherical stereo matching network, comprising:
    a sensor operable to capture one or more equirectangular projection (ERP) images;
    a controller operable to:
       receive a feature map from a spherical feature extraction machine learning algorithm; and
       transform an inverse depth hypothesis to a displacement in a spherical-coordinate domain, wherein the displacement is generated using a cosine angle of one or more latitudinal values across the one or more ERP images, one or more baseline values, and a height of the feature map.

16. The system of claim 15, wherein the inverse depth hypothesis covers a whole depth range.

17. The system of claim 15, further comprising: mapping one or more pixels from one or more synthesized images to the ERP image.

18. A method for employing a spherical warping layer machine learning algorithm within a spherical stereo matching network, comprising:
    receiving one or more equirectangular projection (ERP) images from a sensor;
    receiving a feature map from a spherical feature extraction machine learning algorithm;
    transforming a sampled disparity to a displacement in a spherical-coordinate domain, wherein the displacement is generated using a cosine angle of one or more latitudinal values across the one or more ERP images, one or more baseline values, and a height of the feature map; and
    configuring a physical system to operate using the displacement in the spherical-coordinate domain.

19. The method of claim 18, further comprising: transforming an inverse depth hypothesis to the displacement in the spherical coordinate domain, wherein the inverse depth hypothesis covers a whole depth range.

20. The method of claim 18, further comprising: mapping one or more pixels from one or more synthesized images to the ERP image.

* * * * *